(12) United States Patent
Kawashima (10) Patent No.: US 8,248,019 B2
(45) Date of Patent: Aug. 21, 2012

(54) BRUSHLESS MOTOR

(75) Inventor: Toshiaki Kawashima, Funabashi (JP)

(73) Assignee: Edwards Japan Limited (JP)

( * ) Notice: Subject to any disclaimer, the term of this patent is extended or adjusted under 35 U.S.C. 154(b) by 369 days.

(21) Appl. No.: 12/602,097

(22) PCT Filed: May 12, 2008

(86) PCT No.: PCT/JP2008/058706
§ 371 (c)(1),
(2), (4) Date: Nov. 26, 2009

(87) PCT Pub. No.: WO2008/149638
PCT Pub. Date: Dec. 11, 2008

(65) Prior Publication Data
US 2010/0176756 A1    Jul. 15, 2010

(30) Foreign Application Priority Data
Jun. 5, 2007 (JP) .................................. 2007-149277

(51) Int. Cl.
*H02P 7/00* (2006.01)
(52) U.S. Cl. .................... 318/727; 318/400.11; 318/439; 318/254
(58) Field of Classification Search .............. 318/400.04, 318/400.1, 400.11, 400.3, 400.32, 254, 432, 318/700, 727, 439
See application file for complete search history.

(56) References Cited

U.S. PATENT DOCUMENTS

| 5,739,652 | A * | 4/1998 | Sriram ...................... 318/400.04 |
| 6,388,416 | B1 * | 5/2002 | Nakatani et al. ............ 318/700 |
| 6,759,827 | B2 * | 7/2004 | Kawashima .................. 318/727 |
| 7,071,640 | B2 * | 7/2006 | Kurosawa et al. ........ 318/400.04 |
| 7,626,350 | B2 * | 12/2009 | Mori et al. ...................... 318/432 |
| 7,750,586 | B2 * | 7/2010 | Kurosawa et al. ........ 318/400.32 |
| 2002/0047683 | A1 * | 4/2002 | Kawashima .................. 318/721 |
| 2004/0080293 | A1 * | 4/2004 | Kurosawa et al. ............. 318/459 |
| 2006/0055352 | A1 * | 3/2006 | Mori et al. ..................... 318/432 |
| 2006/0082336 | A1 * | 4/2006 | Kurosawa et al. ............. 318/254 |
| 2008/0297082 | A1 * | 12/2008 | Kurosawa et al. ........ 318/400.11 |
| 2009/0056385 | A1 * | 3/2009 | Maekawa ..................... 68/12.16 |
| 2010/0237809 | A1 * | 9/2010 | Ogahara .................. 318/400.13 |

FOREIGN PATENT DOCUMENTS

| JP | 2002-176793 A | 6/2002 |
| JP | 2004-140975 A | 5/2004 |

* cited by examiner

Primary Examiner — Paul Ip (57) ABSTRACT

To further improve the stability of drive control for the start period of a motor without complicating a circuit configuration.

During the period in which the rotational speed of a rotor does not reach the rotational speed capable of locking a PLL circuit, a drive control method of two-phase mode in which a start current is supplied by two energizing patterns is used. In energizing pattern A, a current is caused to flow in a motor winding in the direction from U to W and in the direction from V to W at the same time. In energizing pattern B, a current is caused to flow in the motor winding in the direction from W to U and in the direction from W to V at the same time. A potential difference $V_{u-v}$ between a U phase and a V phase in which the phase and magnitude of voltage drop due to inductance are equal is detected. Based on the detected potential difference $V_{u-v}$, a magnetic flux estimation signal $\phi_{u-v}$ is calculated by an integrator. Then, based on the magnetic flux estimation signal $\phi_{u-v}$, an ROT signal is sent from a comparator. The energizing pattern of the start current is switched over according to the ROT signal, and torque in the normal rotation direction is developed, by which the rotor is accelerated.

4 Claims, 5 Drawing Sheets

(ENERGIZING PATTERN A)        (ENERGIZING PATTERN B)

|  |  | POLARITY OF $\phi_{u-v}$ | DIRECTION OF ACTION OF TORQUE |
|---|---|---|---|
| POSITION A | NORMAL DIRECTION | NEGATIVE | NORMAL DIRECTION |
|  | REVERSE DIRECTION | POSITIVE | REVERSE DIRECTION |
| POSITION B | NORMAL DIRECTION | NEGATIVE | REVERSE DIRECTION |
|  | REVERSE DIRECTION | POSITIVE | NORMAL DIRECTION |
| POSITION C | NORMAL DIRECTION | POSITIVE | REVERSE DIRECTION |
|  | REVERSE DIRECTION | NEGATIVE | NORMAL DIRECTION |
| POSITION D | NORMAL DIRECTION | POSITIVE | NORMAL DIRECTION |
|  | REVERSE DIRECTION | NEGATIVE | REVERSE DIRECTION |

(b)

| POLARITY OF $\phi_{u-v}$ | ENERGIZING PATTERN | DIRECTION OF ACTION OF TORQUE |
|---|---|---|
| POSITIVE | A | REVERSE DIRECTION |
|  | B | NORMAL DIRECTION |
| NEGATIVE | A | NORMAL DIRECTION |
|  | B | REVERSE DIRECTION |

BRUSHLESS MOTOR

TECHNICAL FIELD

The present invention relates to a brushless motor, and particularly to a sensorless brushless motor that is not provided with, for example, a magnetic sensor for detecting the position of a magnetic pole of a rotor.

BACKGROUND ART

Some brushless motors that eliminate a brush and commutator segment from a DC (direct current) motor and have an electronic rectification mechanism have a rotor with a bipolar permanent magnet and U-phase, V-phase and W-phase windings for generating a magnetic field around the rotor to rotate the rotor.

Furthermore, in some brushless motors, there is a sensorless brushless motor that is not provided with a magnetic pole sensor for detecting the position of a magnetic pole of a rotor.

The sensorless brushless motor applies a motor drive current to two of three motor windings to rotate the rotor. Consequently, induced electromotive force is generated in one remaining winding as a result of the rotation of the motor. Then, the position of a magnetic pole of the rotor is detected based on the value of the generated induced electromotive force, and switching control is carried out on currents (drive voltage vectors) of the motor windings based on the position of the magnetic pole.

There is a PLL (Phase Locked Loop) control method as one of the control methods for stabilizing the rotational speed of such a brushless motor.

The PLL control method is a method of matching the phase of a frequency corresponding to the reference rotational speed with the phase of a frequency to be compared.

The PLL control method providing a high degree of stability in the rotational speed is often used in a motor that requires highly precise speed control, such as, for example, a motor incorporated in a turbo-molecular pump or other vacuum pump or in a spindle.

The speed control performed on a motor by the PLL control method requires at least approximately 20 Hz (hertz) of input signal frequency for comparison.

In other words, for example, in a control circuit where 1 pulse of input signal is generated per rotation of a rotor, a PLL circuit cannot be locked (operated) if the rotor does not rotate approximately 20 times per second.

Therefore, energization control is performed on the winding of the motor by an open-loop until the rotational speed of the rotor increases to a certain rotational speed by which the PLL circuit can be locked. Specifically, when starting up the motor, switching control of the drive voltage vector to the motor is executed without feedback control.

For example, the drive voltage vector is first switched at a low frequency (low speed) close to a DC (direct current), and the rotor is caused to follow the switching speed as it is gradually increased. In this manner, the rotational speed of the rotor is increased to the rotational speed by which the PLL circuit can be locked.

As described above, the time period (start-up time period) during which the rotational speed of the rotor is increased to the rotational speed for locking the PLL circuit is subjected to drive control by an open-loop. Therefore, when the speed of switching the drive voltage vector increases too fast or the load on the rotor changes rapidly, the rotor cannot follow the magnetic field formed by the winding of the motor and loses its synchronism, failing in starting up.

Furthermore, in the case where the rotor needs to be restarted due to a blackout or the like during the start-up time period, the position of a magnetic pole cannot be detected in a sensorless brushless motor. Thus, the rotor has to be restarted after braking and stopping the rotor once with a direct current.

Technology for achieving stability in control of the start-up time period of the motor and thereby reducing the start-up time period of the motor has conventionally been proposed by Japanese Patent Application Laid-open No. 2002-176793.

Japanese Patent Application Laid-open No. 2002-176793 discloses a technology for detecting the position of a magnetic pole of a rotor based on induced electromotive force generated in the U-phase winding of the motor, which is not energized, and starting up the motor by repeatedly performing the energization from the V phase to the W phase and the energization from the W phase to the V phase sequentially in response to the detected magnetic pole position. Hereafter this start-up method is taken as a first start-up method.

Japanese Patent Application Laid-open No. 2002-176793 also discloses a technology for detecting the position of the magnetic pole of the rotor based on the potential difference between the U phase and the V phase, and starting up the motor by repeatedly performing the energization from the V phase to the W phase and the energization from the W phase to the U phase sequentially in response to the detected magnetic pole position. Hereafter this start-up method is taken as a second start-up method.

SUMARY OF INVENTION

Technical Problem

Although control that is performed using the first start-up method disclosed in Japanese Patent Application Laid-open No. 2002-176793 can keep a high degree of stability, it is difficult to reduce the production cost of the motor due to an increasingly complex circuit configuration.

On the other hand, control that is performed using the second start-up method disclosed in Japanese Patent Application Laid-open No. 2002-176793 can provide a relatively simple circuit configuration, but a non-activation region where torque in the reverse direction of the rotor is generated exists in a range of 60°. For this reason, in some cases, the rotor cannot be accelerated smoothly in its normal rotation direction, and the stability cannot be maintained appropriately upon start-up of the motor.

Moreover, in the control that is performed using the second start-up method, the direct-current component caused by the resistance component of the winding of the motor is superimposed on a detection signal of the potential difference between the U phase and the V phase. Hence, a low-frequency fluctuation occurs on the detection signal.

An object of the present invention, therefore, is to improve the stability in drive control performed during the start-up time period (low-speed rotation time period) of the motor without making the circuit configuration complicated.

Technical Solution

In order to achieve the object described above, an invention described in claim 1 provides a brushless motor, which has a rotor provided with a magnetic pole, polyphase motor windings for rotating the rotor, and current supply means for supplying a drive current to the polyphase motor windings, wherein any one of the polyphase motor windings is specified as a first winding and the rest of the plurality of motor windings as second windings, and wherein the brushless motor has: rotating means for rotating the rotor by simultaneously applying the drive current between the first winding and two of the second windings where phases and amplitudes of voltage drop caused by inductances of the second windings become equal; voltage difference acquisition means for acquiring a difference in voltage acting on the two second windings to which the drive current is applied; magnetic pole position acquisition means for acquiring a magnetic pole position of the rotor based on the difference in voltage acquired by the voltage difference acquisition means; and first drive current control means for controlling the drive current based on the magnetic pole position of the rotor that is acquired by the magnetic pole position acquisition means.

An invention described in claim 2 provides the brushless motor described in claim 1, which further has an integrator that integrates the difference in voltage acquired by the voltage difference acquisition means, wherein the magnetic pole position acquisition means acquires the magnetic pole position of the rotor based on an integration value of the difference in voltage acquired by the voltage difference acquisition means.

An invention described in claim 3 provides the brushless motor described in claim 1 or 2, wherein the first drive current control means controls the drive current based on the magnetic pole position acquired by the magnetic pole position acquisition means, when the rotational speed of the rotor is equal to or less than a predetermined value.

An invention described in claim 4 provides the brushless motor described in claim 1, 2 or 3, which further has second drive current control means for controlling the drive current supplied to the polyphase motor windings by performing open-loop control, wherein the brushless motor applies a current to the polyphase motor windings for a predetermined time period by means of the second drive current control means, and thereafter starts controlling the drive control by means of the first drive current control means.

Advantageous Effects

According to the present invention, a control circuit of the brushless motor can detect the magnetic pole position of the rotor without using a sensor, even when the rotor rotates at low speed at which the PLL circuit cannot be locked, and consequently perform feedback control on the drive voltage vector. As a result, the time required for starting up the motor can be reduced.

BRIEF DESCRIPTION OF THE DRAWINGS

FIG. 3(*a*) is a diagram showing a drive voltage vector; FIG. 3(*b*) is a diagram showing a magnetic flux vector generated when the two-phase mode drive control is performed; and FIG. 3C is a diagram showing a state of torques generated when the two-phase mode drive control is performed;

FIG. 6(*a*) is a diagram showing the relationship between a direction of rotation of the rotor and a polarity of the magnetic flux estimation signal ϕu-v; and FIG. 6(*b*) is a diagram showing the relationship between the polarity of the magnetic flux estimation signal ϕu-v and a direction of action of the torques.

EXPLANATION OF REFERENCE

101 Integrator
102 DC blocking filter
103 Differential amplifier
104 Comparator
105 Motor
107U,107V,107W Motor windings
109 Midpoint
112 Rotor
115 Motor drive circuit
116 Direct-current power supply
121*a~f* Transistor
130 Microcomputer
141 Control circuit

DETAILED DESCRIPTION OF THE INVENTION

Hereinafter, an embodiment of a control circuit of the brushless motor of the present invention is described with reference to FIGS. 1 to 6.

The present embodiment describes a two-phase mode drive control method (motor drive system) that is used during a time period in which the rotational speed of a rotor is less than the rotational speed by which a PLL circuit can be locked. After the rotational speed of the rotor increases to the rotational speed by which the PLL circuit can be locked, the control system is switched to a three-phase motor drive system that uses the PLL circuit described in Japanese Patent Application Laid-open No. 2002-176793. Note that the description of the three-phase mode motor drive system is omitted.

Figure 1:
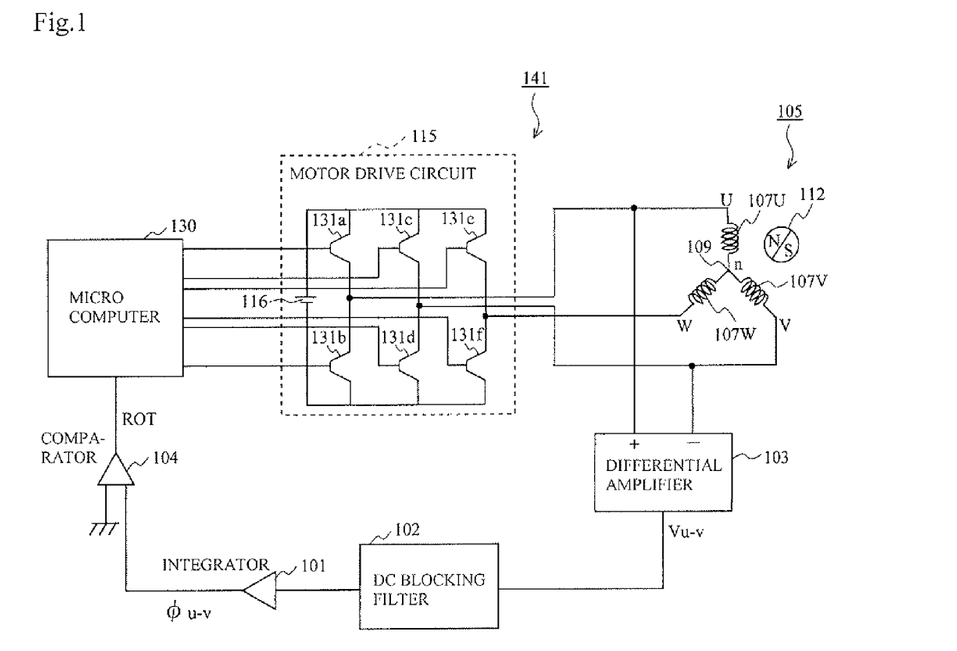
FIG. 1 is a diagram showing the main configuration of a control circuit of a brushless motor according to an embodiment.

FIG. 1 is a diagram showing the main configuration of a control circuit of the brushless motor according to the embodiment.

A control circuit 141 of the present embodiment is provided with a motor 105 configured by a rotor 112 having a bipolar permanent magnet and star-connected motor windings 107U, 107V, 107W for rotating the rotor 112, a motor drive circuit 115 that supplies a current to these motor windings 107U, 107V, 107W, and a microcomputer 130 that controls the motor drive circuit 115.

The motor 105, a sensorless brushless motor without a magnetic pole sensor for detecting the position of the magnetic pole of the rotor 112, detects the position of the magnetic pole of the rotor 112 on the basis of induced electromotive forces generated in the motor windings 107U, 107V, 107W in the present embodiment.

FIG. 1 shows each of the motor windings 107U, 107V, 107W and the rotor 112 separately for the sake of convenience, but in fact the motor windings 107U, 107V, 107W are disposed in an outer circumferential part of the rotor 112.

The motor drive circuit 115 has a direct-current power supply 116 and six transistors 121*a*, 121*b*, 121*c*, 121*d*, 121*e*, 121*f* configuring a three-phase bridge. The base of each of the transistors 121*a*, 121*b*, 121*c*, 121*d*, 121*e*, 121*f* is connected to the microcomputer 130. Each of the transistors 121*a*, 121*b*, 121c, 121d, 121e, 121f is turned ON/OFF by a base (gate) drive pulse sent by the microcomputer 130, and supplies a predetermined current to the motor windings 107U, 107V, 107W.

The motor drive circuit 115 supplies a predetermined current to the motor windings 107U, 107V, 107W while being controlled by the microcomputer 130.

The control circuit 141 is further provided with a differential amplifier 103, a DC blocking filter 102, an integrator 101, and a comparator 104.

The differential amplifier 103 is connected to the motor windings 107U, 107V, and outputs a potential difference Vu-v, which is a value obtained subtracting the voltage of the motor winding 107V from the voltage of the motor winding 107U.

Note that the indices u, v represent a U-phase terminal and a V-phase terminal, respectively. Hereinafter, based on a midpoint 109, a U-phase potential is represented as "Vu-n," a V-phase potential as "Vv-n," and a W-phase potential as "Vw-n." The index n represents the midpoint 109.

The DC blocking filter 102 cuts a direct-current component contained in an output signal of the differential amplifier 103. When a direct-current component is contained in the output of the differential amplifier 103, the integrator 101 integrates the direct-current component. Therefore, the DC blocking filter 102 functions to eliminate such direct-current component beforehand. Note that the DC blocking filter 102 can be realized with a high-pass filter as well.

The integrator 101 integrates the output of the differential amplifier 103 from which the direct-current component is eliminated, and eliminates electrical noise superimposed on the output of the differential amplifier 103. Operating the motor 105 generates various electrical noises. A signal obtained from the differential amplifier 103 cannot be used when such noises are superimposed on the signal. By integrating the signal filled with noises by using the integrator 101, the noises can be averaged and only the signal filled with noises can be obtained.

Because noises superimposed on a signal are randomly generated on the positive and negative sides of the signal at an equal rate, the noises are averaged and canceled by integrating the signal.

The signal that is output by the integrator 101 is taken as a magnetic flux estimation signal (φu-v). This is because an interlinkage magnetic flux is obtained between the motor winding 107U and the motor winding 107V by integrating the potential difference Vu-v, which is the potential difference between the motor winding 107U and the motor winding 107V.

An input terminal of the comparator 104 is connected to a ground of the integrator 101, while an output terminal of the same is connected to the microcomputer 130. The comparator 104 outputs a binary signal (a signal associating two types of voltages, high and low voltages. In this signal the high voltage is represented as Hi and the low voltage as Lo).

The comparator 104 compares the magnetic flux estimation signal with a ground level. When the magnetic flux estimation signal is greater than the ground level, Hi is output. When the magnetic flux estimation signal is lower than the ground level, Lo is output. The output of the comparator 104 is called "ROT (rotation pulse signal) signal." In this manner, the comparator 104 generates a pulse signal synchronized with the rotor 112.

The microcomputer 130 receives the ROT signal from the comparator 104, and switches the transistors 121c, 121d, 121e, 121f of the motor drive circuit 115 in synchronization with this ROT signal, and outputs a predetermined drive voltage vector to the motor windings 107V, 107W.

Note that a DSP (Digital Signal Processor), for example, may be used in place of the microcomputer 130, in order to speed up the control of the motor drive circuit 115.

Next is described a two-phase mode drive control operation performed by the control circuit 141 of the present embodiment during a low-speed rotation time period when starting up or stopping the motor 105. The low-speed rotation time period is a time period during which the rotational speed of the rotor 112 is less than the rotational speed for locking the PLL circuit.

Figure 2:
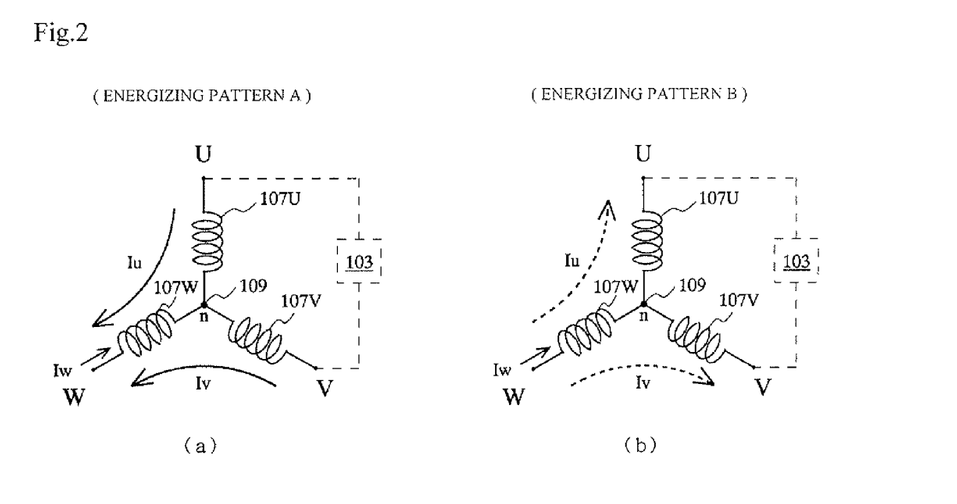
FIG. 2 is a diagram showing an energizing pattern of a starting current when two-phase mode drive control is carried out.

FIG. 2 is a diagram showing an energizing pattern of a starting current when two-phase mode drive control is carried out.

In the present embodiment, the control is carried out in the low-speed rotation time period by using two energizing patterns, an energizing pattern A shown in FIG. 2(a) and energizing pattern B shown in FIG. 2(b).

With the energizing pattern A shown in FIG. 2(a), currents are applied simultaneously to the motor windings 107U, 107V, 107W in the direction of U→W and V→W.

With the energizing pattern B shown in FIG. 2(b), currents are applied simultaneously to the motor windings 107U, 107V, 107W in the directions of W→U and W→V.

Here, the current applied in the direction of U→W is represented as Iu, and the current applied in the direction of V→W is represented as Iv. The current applied to the motor winding 107W is represented as Iw.

Iu, Iv, Iw are in a relationship that satisfies the following equation (1) for both energizing patterns A, B, when the direction of the current flowing from each of the motor windings U, V, W to n of the midpoint 109 is taken as positive.

$$Iu=Iv=-Iw/2 \qquad (1)$$

The current that is half of the current applied to the motor winding 107W is applied to the motor windings 107U, 107V in each energizing pattern.

Note that a rectangular wave is used as the waves of the currents Iu, Iv, Iw.

Here, the W-phase motor winding 107W functions as the first winding described in claim 1, and the U-phase and V-phase motor windings 107U, 107V function as the second windings.

FIG. 3(a) is a diagram showing a drive voltage vector.

As shown in FIG. 3(a), there are six types of drive voltage vectors that are output to the motor windings 107U, 107V, 107W of a three-phase full wave type brushless motor.

A drive voltage vector for applying a current from the U-phase motor winding 107U to the V-phase motor winding 107V is called a drive voltage vector 1. A drive voltage vector for applying a current from the U-phase motor winding 107U to the W-phase motor winding 107W is called a drive voltage vector 2. A drive voltage vector for applying a current from the V-phase motor winding 107V to the W-phase motor winding 107W is called a dive voltage vector 3. A drive voltage vector for applying a current from the V-phase motor winding 107V to the U-phase motor winding 107U is called a drive voltage vector 4. A drive voltage vector for applying a current from the W-phase motor winding 107W to the U-phase motor winding 107U is called a drive voltage vector 5. A drive voltage vector for applying a current from the W-phase motor winding 107W to the V-phase motor winding 107V is called a drive voltage vector 6. Hereinafter, the drive voltage vectors are distinguished by the numbers.

Figure 3:
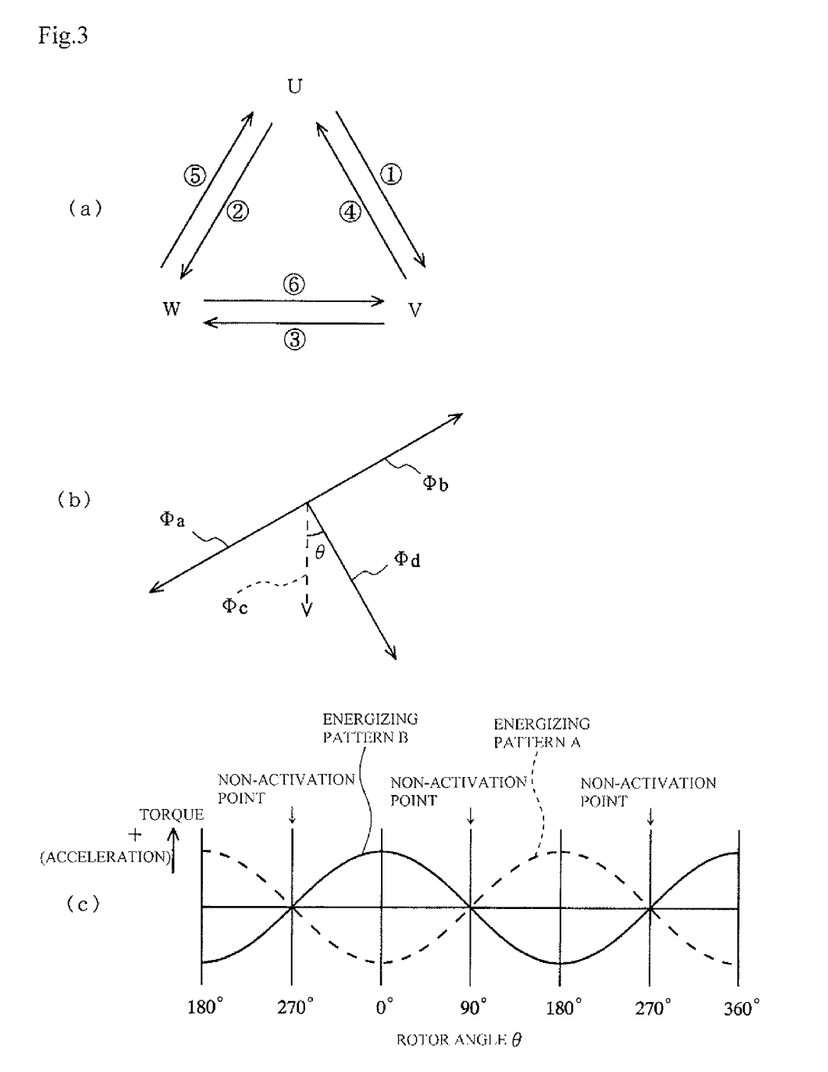

The numbers of these drive voltage vectors are shown by the circle in FIG. 3.

The energizing pattern A of current described above shows a state in which the drive voltage vector 2 and the drive voltage vector 3 are output simultaneously. The energizing pattern B shows a state in which the drive voltage vector 5 and the drive voltage vector 6 are output simultaneously.

In the case of the energizing pattern A, the transistors 121a, 121c, 121f are turned on to output the drive voltage vectors 2, 3 simultaneously. In the case of the energizing pattern B, the transistors 121b, 121d, 121e are turned on to output the drive voltage vectors 5, 6 simultaneously.

Note that the currents applied to the motor windings 107U, 107V, 107W in the energizing patterns A, B are controlled by performing PWM (pulse-width modulation) control on a base (gate) voltage of the transistors to be operated, by using the microcomputer 130.

FIG. 3(b) is a diagram showing a magnetic flux vector generated when the two-phase mode drive control is performed.

The vector diagram of FIG. 3(b) illustrates a magnetic flux vector generated in the energizing pattern A as Φa, and a magnetic flux vector generated in the energizing pattern B as Φb.

A magnetic flux vector of the permanent magnet of the rotor 112 is represented as Φc, and the angle of rotation of the rotor 112 is represented as θ. Note that θ indicates that a magnetic flux vector Φd that is generated by outputting the drive voltage vector 1 when applying a current from the U-phase motor winding 107U to the V-phase motor winding 107V is 0°, and that a clockwise direction is a positive (+) direction.

In the present embodiment, energization is performed by the energizing patterns A, B alternately to generate, in the motor windings 107U, 107V, 107W, a magnetic field that is formed by the magnetic flux vectors Φa, Φb shown in FIG. 3(b). This magnetic field is caused to draw and rotate the rotor 112.

Then, the ROT signal is generated from the difference between the voltage of the U-phase terminal and the voltage of the V-phase terminal. This ROT signal is used to perform feedback control on the drive voltage vectors 2, 3 in the energizing pattern A as well as the drive voltage vectors 5, 6 in the energizing pattern B.

FIG. 3C is a diagram showing a state of torques generated when the two-phase mode drive control is performed.

As shown in FIG. 3C, the torque generated during the energizing pattern A and the torque generated during the energizing pattern B are inverted by a phase of 180°.

In addition, during the two-phase mode drive control, the torques in both the positive (+) and negative (−) directions can be generated within a range excluding a non-activation point.

Note that the non-activation point is a state in which the torques in both positive and negative directions cannot be generated when the rotor angle θ is 90° and 270°.

Next, the two-phase mode drive control is described in detail with an example of an operation performed when accelerating the rotor.

Figure 4:
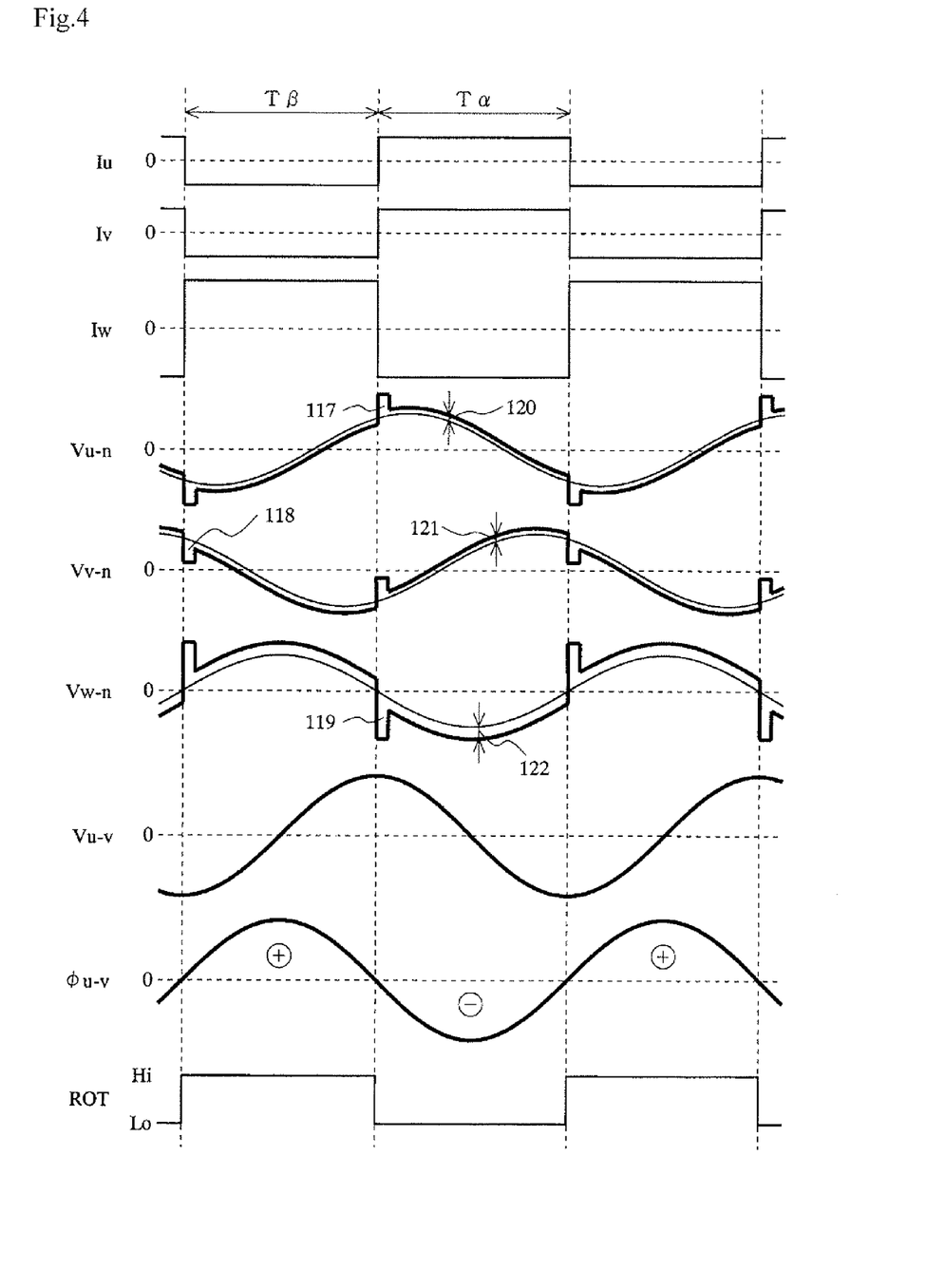
FIG. 4 is a diagram illustrating the relationship among currents Iu, Iv, Iw, voltages Vu-n, Vv-n, Vw-n, a potential difference Vu-v, a magnetic flux estimation signal ϕu-v that is output from an integrator, and a ROT signal that is output from a comparator, when a rotor is accelerated.

FIG. 4 is a diagram illustrating the relationship among the currents Iu, Iv, Iw, voltages Vu-n, Vv-n, Vw-n, potential difference Vu-v, magnetic flux estimation signal φu-v that is output from the integrator 101, and ROT signal that is output from the comparator 104, when the rotor 112 is accelerated.

When starting the motor 105, the energizing patterns A, B are repeatedly performed alternately with a frequency close to a direct current, and the magnetic pole of the rotor 112 is caused to follow the magnetic field formed by the motor windings 107U, 107V, 107W.

When the rotor 112 starts rotating approximately once per second, the potential difference Vu-v between the motor winding 107U and the motor winding 107V can be detected as an interphase voltage.

In the present embodiment, the potential difference Vu-v (interphase voltage) between the U phase and the V phase where phases, amplitudes and resistance components of voltage drop caused by inductances become equal is detected.

While the drive voltage vectors 2, 3 are output by the energizing pattern A, a current is applied in the U→W direction and V→W direction. While the drive voltage vectors 5, 6 are output by the energizing pattern B, a current is applied in the W→U direction and W→V direction. The current applied to the both motor windings 107U, 107V is applied to the motor winding 107W. Therefore, the waveforms of the currents Iu, Iv, Iw become the ones shown in FIG. 4.

When the rotor 112 is rotated by performing energization by the energizing patterns A, B alternately, the induced voltages Vu-n, Vv-n, Vw-n are generated in the motor windings 107U, 107V, 107W, respectively.

Because the drive currents are applied to the motor windings 107U, 107V, 107W, spike-like voltages 117, 118, 119 and the like resulted from voltage drop caused by the inductances of the motor windings 107U, 107V, 107W appear in the induced voltages Vu-n, Vv-n, Vw-n.

Furthermore, the induced voltages Vu-n, Vv-n, Vw-n include direct-current components 120, 121, 122 resulted from the resistance components of the motor windings 107U, 107V, 107W.

In the present embodiment, the voltage difference Vu-v between the induced voltages Vu-n and Vv-n is measured by the differential amplifier 103, and the position of the magnetic pole of the rotor 112 is detected based on the voltage difference Vu-v.

Because the spike-like voltages 117, 118 of the same phase and amplitude appear in the voltages Vv-n, Vu-n, these spike-like voltages 117, 118 can be deleted (offset) when the difference between the voltages Vv-n, Vu-n is obtained by the differential amplifier 103.

Moreover, because the direct-current components 120, 121 of the same polarity and amplitude are superimposed in the voltages Vv-n, Vu-n, these direct-current components 120, 121 can be deleted when the difference between the voltages Vv-n, Vu-n is obtained by the differential amplifier 103.

The potential difference Vu-v is expressed in the following equation (2) using the resistance components Ru, Rv, Rw of the respective motor windings 107U, 107V, 107W and the inductances Lu, Lv, Lw of the respective phases.

$$Vu\text{-}v = Vu\text{-}n + Ru*Iu + \omega*Lu*Iu - Vv\text{-}n - Rv*Iv - \omega*Lv*Iv \quad (2)$$

(where ω represents the angular rate of the rotor 112).

Therefore, when the amplitudes of the resistance components Ru, Rv, Rw and the inductances Lu, Lv, Lw of the respective phases are equal to one another, the potential difference Vu-v is expressed in the following equation (3) based on the equations (1) and (2).

$$Vu\text{-}v = Vu\text{-}n - Vv\text{-}n \quad (3)$$

Specifically, the values obtained as a result of the voltage drop caused by the resistance components Ru, Rv, Rw and the inductances Lu, Lv, Lw are offset and therefore do not appear in the potential difference Vu-v.

Therefore, the output of the differential amplifier 103, i.e., the potential difference Vu-v, forms a neat sine curve synchronized with the rotation of the rotor 112, as shown in FIG. 4.

Note that when the amplitudes of the resistance components Ru, Rv, Rw are equal to one another, the direct-current components 120, 121 can be deleted as described above. Hence, it is not always necessary to provide the DC blocking filter 102 between the differential amplifier 103 and the integrator 101.

The potential difference Vu-v that is output from the differential amplifier 103 is input to the integrator 101 after the direct-current components thereof are cut off by the DC blocking filter 102.

The integrator 101 integrates the potential difference Vu-v and outputs the magnetic flux estimation signal φu-v. The phase of the magnetic flux estimation signal φu-v is delayed by 90° from the potential difference Vu-v due to the integration. Furthermore, the noises superimposed on the potential difference Vu-v are integrated and thereby eliminated.

Note that the magnetic flux estimation signal φu-v output by the integrator 101 and the potential difference Vu-v are in the relation satisfying the following equation (4).

$$\phi u\text{-}v = -\int Vu\text{-}v\, dt \tag{4}$$

In this manner, the magnetic flux estimation signal φu-v is obtained by integrating the potential difference Vu-v between the motor winding 107U and the motor winding 107V.

Because the potential difference Vu-v appears as the signal forming the neat sine curve as described above, a neat magnetic flux estimation signal φu-v is obtained.

The comparator 104 compares the magnetic flux estimation signal φu-v with the ground level and outputs the ROT signal.

When the magnetic flux estimation signal φu-v is greater than the ground level, the ROT signal that is output from the comparator 104 becomes Hi. When the magnetic flux estimation signal φu-v is lower than the ground level, the ROT signal becomes Lo.

Then, the microcomputer 130 receives the ROT signal from the comparator 104, and applies the starting current by means of the energizing pattern A as long as the ROT signal is Hi upon acceleration, or applies the starting current by means of the energizing pattern B as long as the ROT signal is Lo upon acceleration.

Note that the energizing pattern used in the control method for decelerating the rotor and the energizing pattern used in the acceleration are inverted.

Next, feedback control performed during the two-phase mode drive control (low-speed rotation time period) is described in detail.

Figure 5:
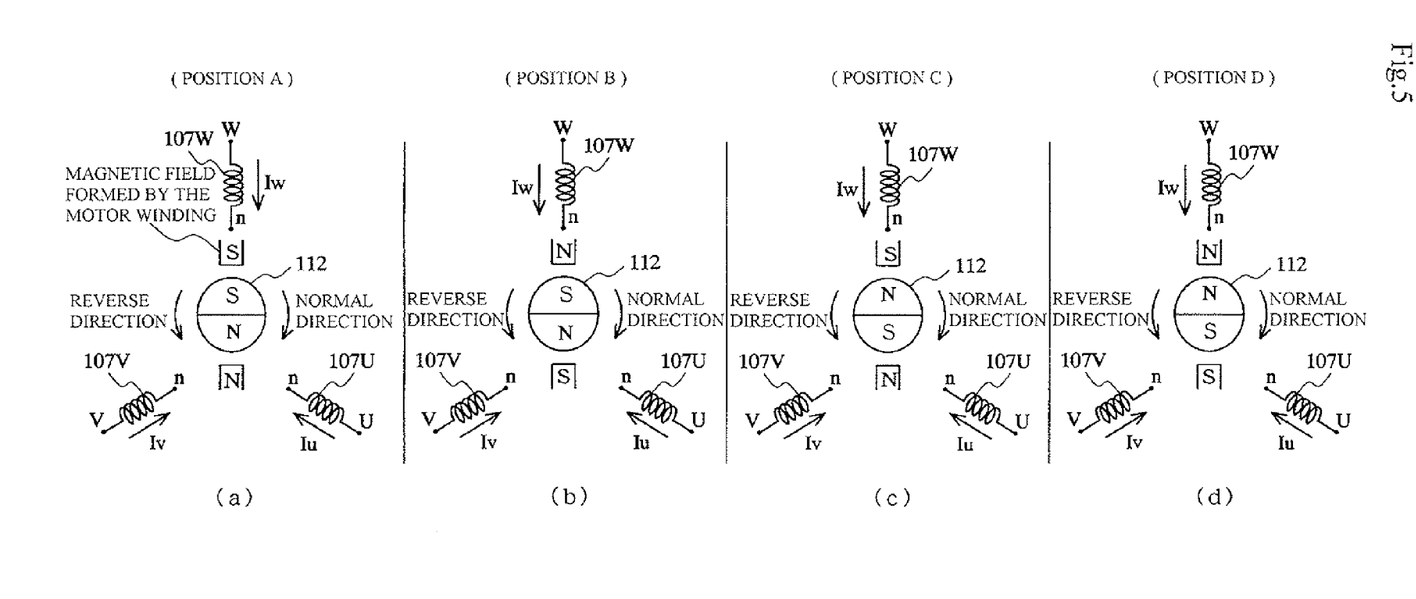
FIG. 5 is a diagram showing the positional relationship between a magnetic field formed by motor windings when the two-phase mode drive control is performed, and a magnetic pole of the rotor.
Figure 6:
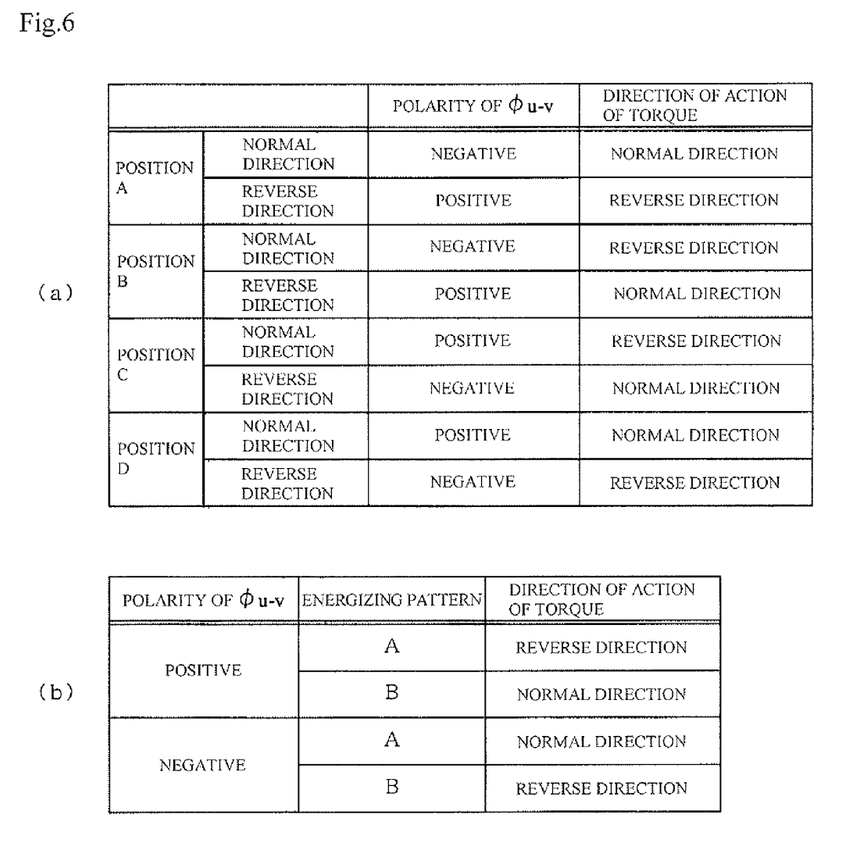

FIG. 5 is a diagram showing the positional relationship between a magnetic field formed by the motor windings 107U, 107V, 107W when the two-phase mode drive control is performed, and the magnetic pole of the rotor 112.

The positional relationships shown in FIGS. 5(a) to 5(d) are illustrated as positions A to D, respectively. As shown in FIGS. 5(a) to 5(d), in the positions A to D, the combination of the orientation of the magnetic field formed by the motor windings 107U, 107V, 107W and the orientation of the magnetic pole of the rotor 112 varies.

FIG. 6(a) is a diagram showing the relationship between a direction of rotation of the rotor 112 and the polarity of the magnetic flux estimation signal φu-v. FIG. 6(b) is a diagram showing the relationship between the polarity of the magnetic flux estimation signal φu-v and a direction of action of the torques.

Note that in this specification the clockwise direction is the normal rotation direction, and the counterclockwise direction the reverse direction.

In the case where the rotor 112 rotates in the normal rotation direction, the polarity of the magnetic flux estimation signal φu-v becomes negative (minus) as long as the position of the magnetic field formed by the motor windings 107U, 107V, 107W and the position of the magnetic pole of the rotor 112 are in the relationship represented by the position A as shown in FIG. 5(a).

On the other hand, in the case where the rotor 112 rotates in the reverse direction, the polarity of the magnetic flux estimation signal φu-v becomes positive (plus) as long as the position of the magnetic field formed by the motor windings 107U, 107V, 107W and the position of the magnetic pole of the rotor 112 are in the relationship represented by the position A as shown in FIG. 5(a).

Similarly, the relationship between the direction of rotation of the rotor 112 and the polarity of the magnetic flux estimation signal φu-v becomes the one shown in FIG. 6(a).

As shown in FIG. 6(b), when the two-phase mode drive control is performed, a torque in the reverse direction acts when a drive current is supplied using the energizing pattern A during a time period in which the polarity of the magnetic flux estimation signal φu-v becomes positive (plus). Contrary to this, a torque in the normal rotation direction acts when a drive current is supplied using the energizing pattern B.

On the other hand, the torque in the normal rotation direction acts when a drive current is supplied using the energizing pattern A during a time period in which the polarity of magnetic flux estimation signal φu-v becomes negative (minus). Contrary to this, the torque in the reverse direction acts when a drive current is supplied using the energizing pattern B.

When the two-phase mode drive control is performed, this kind of relationship is established among the polarity of the magnetic flux estimation signal φu-v, the energizing pattern, and the direction where the torque acts.

In other words, by switching the output polarities of the U, V, W phases in accordance with the polarity of the magnetic flux estimation signal φu-v, torques can be applied in a direction where the motor is started.

The energizing patterns of the drive currents are controlled such that a torque acts in the normal rotation direction during a time period when the acceleration is performed in the normal rotation direction, such as when starting up the motor 105. On the other hand, the energizing patterns of the drive currents are controlled such that a torque acts in the reverse direction during a time period when the acceleration (braking in the normal rotation direction) is performed in the reverse direction, such as when stopping the motor 105.

For example, when the acceleration is carried out in the normal rotation direction, as shown in FIG. 4, a drive current is supplied using the energizing pattern B to act a torque in the normal rotation direction during a time period Tβ in which the magnetic flux estimation signal φu-v becomes positive (time period in which the ROT signal is Hi), and a drive current is supplied using the energizing pattern A to act a torque in the normal rotation direction during a time period Tα in which the magnetic flux estimation signal φu-v becomes negative (time period in which the ROT signal is Lo).

Moreover, when the acceleration is carried out in the reverse direction, a drive current is supplied using the energizing pattern A to act a torque in the reverse direction during the time period in which the magnetic flux estimation signal φu-v is positive, and a drive current is supplied using the energizing pattern B to act a torque in the reverse direction during the time period in which the magnetic flux estimation signal φu-v is negative.

As described above, according to the present embodiment, a torque of a desired direction can be obtained properly by switching between the energizing patterns of drive currents in the two-phase mode, in accordance with the polarity of the magnetic flux estimation signal φu-v. Hence, the acceleration operation of the rotor 112 can be smoothly carried out in the normal rotation direction or the reverse direction. In other words, high stability can be ensured in the drive control during the low-speed rotation time period.

According to the present embodiment, the values obtained as a result of voltage drop caused by the resistance components Ru, Rv, Rw of the motor windings 107U, 107V, 107W do not affect the magnetic flux estimation signal φu-v. In other words, a direct-current offset does not appear (is not superimposed on) the magnetic flux estimation signal φu-v. Therefore, feedback control can be performed based on an appropriate signal, and high stability can be ensured in the drive control during the low-speed rotation time period.

Specifically, the present embodiment can solve the problem regarding complication of the circuit configuration of the first start-up method described in Japanese Patent Application Laid-open No. 2002-176793, as well as the problem where a direct-current offset of the second start-up method appears in a detection signal.

(Modification)

A modification of the above-described present invention is described next.

In the two-phase mode drive control described in the present embodiment above, the non-activation point is generated at angles (90° and 270°) where the magnetic flux vector Φc of the permanent magnet of the rotor 112 is different from the magnetic flux vector Φa or magnetic flux vector Φb by 90° during the energization as shown in FIG. 3C.

For example, upon start-up of the motor 105 (stopped), in the case where the magnetic flux vector Φc of the permanent magnet of the rotor 112 is positioned in the non-activation point, no torque acts in the normal rotation direction or reverse direction even when a drive current is supplied by the energizing pattern A, B. Therefore, there is a possibility that the motor 105 cannot be started smoothly.

Therefore, in order to prevent (inhibit) the occurrence of a start-up failure caused by such a non-activation point, the following drive processing is executed before starting the control using the energizing patterns A, B as described above.

First, the integrator 101 is switched off. As a method of switching the integrator 101 off, there is, for example, a method of providing a switch for opening and closing a connection circuit (connecting wiring), between the direct-current blocking filter 102 and the differential amplifier 103, and blocking the transmission of signal to the integrator 101 while leaving the switch open.

After the integrator 101 is switched off, the energization of the motor wirings 107U, 107V, 107W in the U→V direction and V→U direction is repeated once or more. This energization processing generates a torque for rotating the rotor 112 and thereby operates the rotor 112. Note that this energization control is carried out by an open-loop.

The integrator 101 is switched on upon completion of this energization processing, and the control is switched to the two-phase mode drive control described above.

By repeating the energization in the U→V direction and V→U direction once or more when starting up the motor 105, the rotor 112 is forcibly rotated even when the magnetic flux vector Φc of the permanent magnet of the rotor 112 is positioned in the non-activation point upon start-up of the motor 105 (stopped). Hence, the rotor 112 is not stopped when the control is switched to the two-phase mode drive control. Therefore, it is possible to appropriately prevent the occurrence of an activation failure caused by the non-activation point, after the control is switched to the two-phase mode drive control.

The direct-current offset can be prevented from accumulating in the integrator 101, by switching the integrator 101 off during the time period when the energization is carried out in the U→V direction and V→U direction.

In addition, when the drive currents are carried in the U→V direction and V→U direction with the same pulse width, that is, when the amplitude of the drive currents and the energization time periods are made equal between the U∝3V direction and the V→U direction, the impact of the direct-current offset can be eliminated by averaging detection signals of the differential amplifier 103. In this case, the integrator 101 does not need to be switched off during the time period when the energization is performed in the U→V direction and V→U direction. Therefore, the start-up processing of the motor 105 can be performed easily.

I claim:

1. A brushless motor, which has a rotor provided with a magnetic pole, polyphase motor windings for rotating the rotor, and current supply means for supplying a drive current to the polyphase motor windings, wherein any one of the polyphase motor windings is specified as a first winding and the rest of the plurality of motor windings as second windings, and wherein the brushless motor comprises:

rotating means for rotating the rotor by simultaneously applying the drive current between two of the second windings where phases and amplitudes of voltage drop caused by inductances of the second windings become equal, and the first winding;

voltage difference acquisition means for acquiring a difference in voltage acting on the two second windings to which the drive current is applied;

magnetic pole position acquisition means for acquiring a magnetic pole position of the rotor based on the difference in voltage acquired by the voltage difference acquisition means; and first drive current control means for controlling the drive current based on the magnetic pole position of the rotor that is acquired by the magnetic pole position acquisition means.

2. The brushless motor according to claim 1, further comprising an integrator that integrates the difference in voltage acquired by the voltage difference acquisition means, wherein the magnetic pole position acquisition means acquires the magnetic pole position of the rotor based on an integration value of the difference in voltage acquired by the voltage difference acquisition means.

3. The brushless motor according to claim 1, wherein the first drive current control means controls the drive current based on the magnetic pole position acquired by the magnetic pole position acquisition means, when the rotational speed of the rotor is equal to or less than a predetermined value.

4. The brushless motor according to claim 1, further comprising second drive current control means for controlling the drive current supplied to the polyphase motor windings by performing open-loop control, wherein the brushless motor applies a current to the polyphase motor windings for a predetermined time period by means of the second drive current control means, and thereafter starts controlling the drive control by means of the first drive current control means.

* * * * *